(12) United States Patent
Sheehan

(10) Patent No.: US 9,610,901 B2
(45) Date of Patent: Apr. 4, 2017

(54) MAGNETIC SUPPORTING DEVICE FOR USE OUTDOORS

(71) Applicant: Gregory Sheehan, Layton, UT (US)

(72) Inventor: Gregory Sheehan, Layton, UT (US)

( * ) Notice: Subject to any disclaimer, the term of this patent is extended or adjusted under 35 U.S.C. 154(b) by 0 days.

(21) Appl. No.: 14/625,896

(22) Filed: Feb. 19, 2015

(65) Prior Publication Data

US 2016/0243997 A1     Aug. 25, 2016

(51) Int. Cl.
    *B60R 9/08*          (2006.01)
    *F16M 13/02*      (2006.01)
    *F16B 1/00*         (2006.01)
    *B60R 11/00*      (2006.01)

(52) U.S. Cl.
    CPC ............... *B60R 9/08* (2013.01); *B60R 11/00* (2013.01); *F16M 13/022* (2013.01); *B60R 2011/004* (2013.01); *B60R 2011/0057* (2013.01); *F16B 2001/0035* (2013.01)

(58) Field of Classification Search
    CPC ..... B60R 9/08; B60R 11/00; B60R 2011/004; F16B 1/00; F16M 13/022; F16M 2001/0035
    USPC ...................... 248/206.5, 674; 211/70.8, 59.4
    See application file for complete search history.

(56) References Cited

U.S. PATENT DOCUMENTS

| | | | | |
|---|---|---|---|---|
| 3,731,817 A | * | 5/1973 | Fowlkes ................ | A01K 97/08 211/70.8 |
| 3,746,177 A | * | 7/1973 | Vilotti .................... | F41A 23/18 211/64 |
| 4,177,595 A | * | 12/1979 | Chon ..................... | A01K 97/10 248/183.2 |
| 4,907,769 A | * | 3/1990 | Hunley, Jr. ............. | F21V 21/06 248/122.1 |
| 4,961,505 A | * | 10/1990 | Moeller ................ | A47F 7/0035 211/65 |
| 5,261,704 A | * | 11/1993 | Araujo .................... | F16L 39/00 137/561 A |
| 5,588,542 A | * | 12/1996 | Winkler, Jr. ......... | A47B 81/005 211/70.8 |
| 5,632,427 A | * | 5/1997 | Gattuso ................. | A01K 97/10 211/70.8 |
| 5,833,102 A | * | 11/1998 | Jacobson ................. | B60R 7/14 211/64 |

(Continued)

*Primary Examiner* — Nkeisha Smith
(74) *Attorney, Agent, or Firm* — David R. Conklin; Kirton McConkie

(57) ABSTRACT

A magnetic supporting device can include a body having a generally triangular shape with a magnet or set of magnets positioned in each corner of the bottom surface of the body. Because of its shape and the positioning of the magnets, the bottom surface of the body can be placed on uneven surfaces while still retaining contact between each magnet and the surface. In this way, the supporting device can be coupled to the surface with sufficient strength to allow many different items such as guns, fishing rods, and bows to be supported against or even hung vertically from the device. The supporting device can include a support structure that extends from a top surface of the supporting device. The support structure can form a number of channels and slots within which items such as guns and fishing rods can be placed. The magnetic nature of the device can also secure it to the hood of a vehicle for use as a rest while shooting a gun, or support optical devices such as cameras, scopes, and other attachable items.

20 Claims, 6 Drawing Sheets

(56) References Cited

U.S. PATENT DOCUMENTS

| | | | | |
|---|---|---|---|---|
| 5,860,573 | A * | 1/1999 | Hossack | B60R 7/06 211/64 |
| 5,975,479 | A * | 11/1999 | Suter | A01K 97/10 248/534 |
| 6,042,080 | A * | 3/2000 | Shepherd | B60R 11/00 248/163.1 |
| 6,293,447 | B1 * | 9/2001 | Jorgensen | B60R 7/14 211/64 |
| 6,439,530 | B1 * | 8/2002 | Schoenfish | B60R 11/02 248/346.06 |
| 6,793,184 | B2 * | 9/2004 | Dougal | A01K 97/10 211/70.8 |
| 6,840,487 | B2 * | 1/2005 | Carnevali | A47B 23/002 248/346.06 |
| 7,690,614 | B1 * | 4/2010 | Mudd | A47B 81/065 224/929 |
| 8,041,029 | B2 * | 10/2011 | Wiegers | F16M 11/10 248/346.03 |
| 8,393,111 | B1 * | 3/2013 | Johnson | A01K 97/10 211/70.8 |
| 8,453,373 | B2 * | 6/2013 | Gordon | A01K 97/10 248/534 |
| 8,695,935 | B1 * | 4/2014 | Kasbohm | F41A 23/18 211/64 |
| 9,017,290 | B2 * | 4/2015 | Peters | A61M 25/02 604/174 |
| 2012/0235810 | A1 * | 9/2012 | McMeekin | B60Q 1/2657 340/473 |

* cited by examiner

MAGNETIC SUPPORTING DEVICE FOR USE OUTDOORS

BACKGROUND

Outdoor sportsmen oftentimes travel by vehicle to engage in an outdoor activity such as hunting or fishing. In such cases, upon arriving at a desired location, a sportsman will typically remove a gun, fishing rod, bow or other item from the vehicle and place the item on or against the vehicle. However, because many of such items are constructed of metal or other hard materials, the vehicle is likely to be scratched.

Additionally, a vehicle does not provide many adequate surfaces for supporting such items. For example, if a gun is leaned against the side of a vehicle, it is likely to tip over thereby increasing the likelihood of scratching or, more seriously, the likelihood that the gun will fire inadvertently.

Various supporting devices have been created for use outdoors. For example, United States Patent Publication No. 2008/0087785 by Phillip Roche discloses an object support that includes a magnetic sheet for attaching the object support to the side of a vehicle. Various problems exist with Roche's design including that the magnetic sheet does not function well when attached to an uneven surface and only provides sufficient force to support items that are placed on the ground and leaned against the object support.

BRIEF SUMMARY

The present invention extends to a magnetic supporting device for use outdoors. A supporting device configured in accordance with embodiments of the present invention can include a body having a generally triangular shape with a pivoting or fixed magnet, or set of pivoting or fixed magnets positioned in each corner of the bottom surface of the body. Because of its shape and the positioning of the magnets, the bottom surface of the body can be placed on uneven surfaces while still retaining contact between each magnet and the surface. In this way, the supporting device can be coupled to the surface with sufficient strength to allow many different items to be supported against or even hung from the device.

The supporting device can include a support structure that extends from a top surface of the supporting device. The support structure can form a number of channels and slots within which items such as guns and fishing rods can be placed or suspended. The support structure may also include an exposed magnet or magnetic surface to which a knife or other steel item can be magnetically attached. In some instances, the support structure further includes an integrated mounting system for attaching a camera, spotting scope, fly tying vice, or other component that is capable of being attached to, or supported by the mounting system.

In one embodiment, the present invention is implemented as a magnetic supporting device that includes a body having a triangular shape, a substantially flat bottom surface and a curved top surface. The magnetic supporting device also includes one or more pivoting magnets positioned in each corner of the triangular shape on the bottom surface of the body. A bottom surface of each magnet is spaced from the bottom surface of the body. The supporting device also includes a support structure that extends upwardly from the top surface of the body. The support structure includes one or more outwardly protruding structures for supporting an item when the item is placed in contact with the support structure.

In another embodiment, the present invention is implemented as a magnetic supporting device that includes a body having a triangular shape, a substantially flat bottom surface, and a curved top surface; one or more magnets positioned in each corner of the triangular shape on the bottom surface of the body, each magnet extending outwardly from the bottom surface to form a three point tiltable interface for coupling the magnetic supporting device to a surface; and a support structure that extends upwardly from the top surface of the body, the support structure including one or more protruding structures for vertically supporting an item. In some instances, the one or more protruding structures support an item such that the item is suspended above the ground surface. In some instances, the magnetic interface between the support structure and the surface (such as a side of vehicle) is sufficiently strong enough to support a suspended position of an item that is coupled to, or otherwise supported by the support structure. In some instances, the one or more protruding structures is sufficiently strong enough to support a suspended position of an item that is coupled to, or otherwise supported by the one or more protruding structures.

In another embodiment, the present invention is implemented as a magnetic supporting device that includes a body having a triangular shape, a substantially flat bottom surface, and a curved top surface; one or more magnets positioned in each corner of the triangular shape on the bottom surface of the body, a bottom surface of each magnet being spaced from the bottom surface of the body; and a support structure that extends upwardly from the top surface of the body, the support structure including a first protruding structure positioned on one side of the top surface, a second protruding structure positioned on an opposite side of the top surface, and a third protruding structure positioned between the first and second protruding structures.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

FIGS. 1-5 illustrate various views of a magnetic supporting device 100 in accordance with one or more embodiments of the present invention. Supporting device 100 comprises a body 101 having a generally triangular shape. Body 101 can be constructed of a rigid or semi-rigid material such as plastic or metal. A top surface of body 101 can have a generally curved or convex shape. In some embodiments, the outer surfaces of body 101 can be coated with a rubber material.

Figure 3:
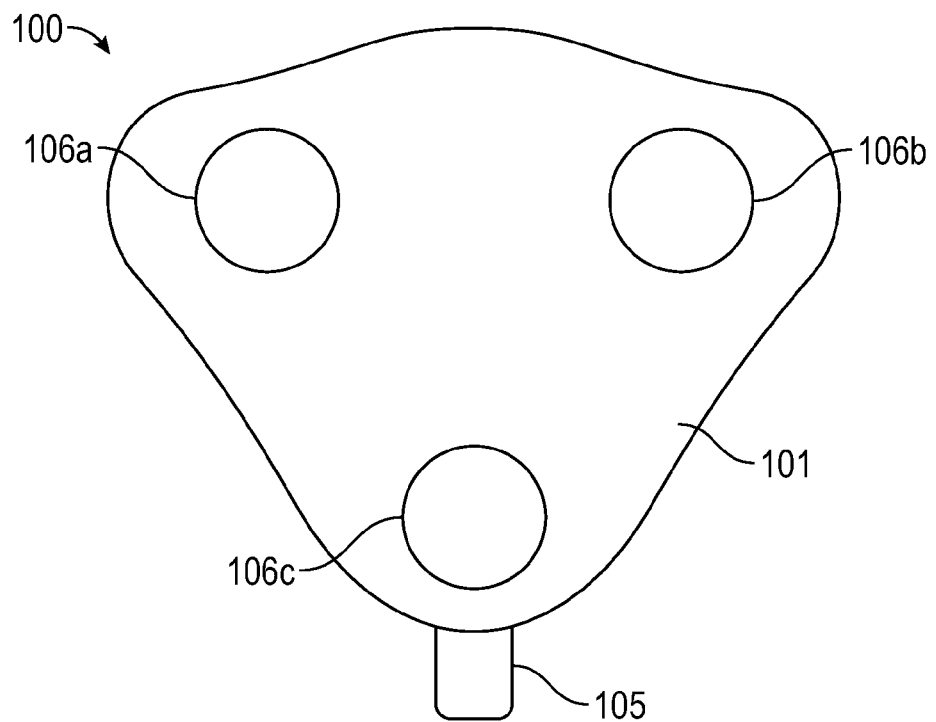
FIG. 3 illustrates a bottom view of the magnetic supporting device of FIG. 1.
Figure 4:
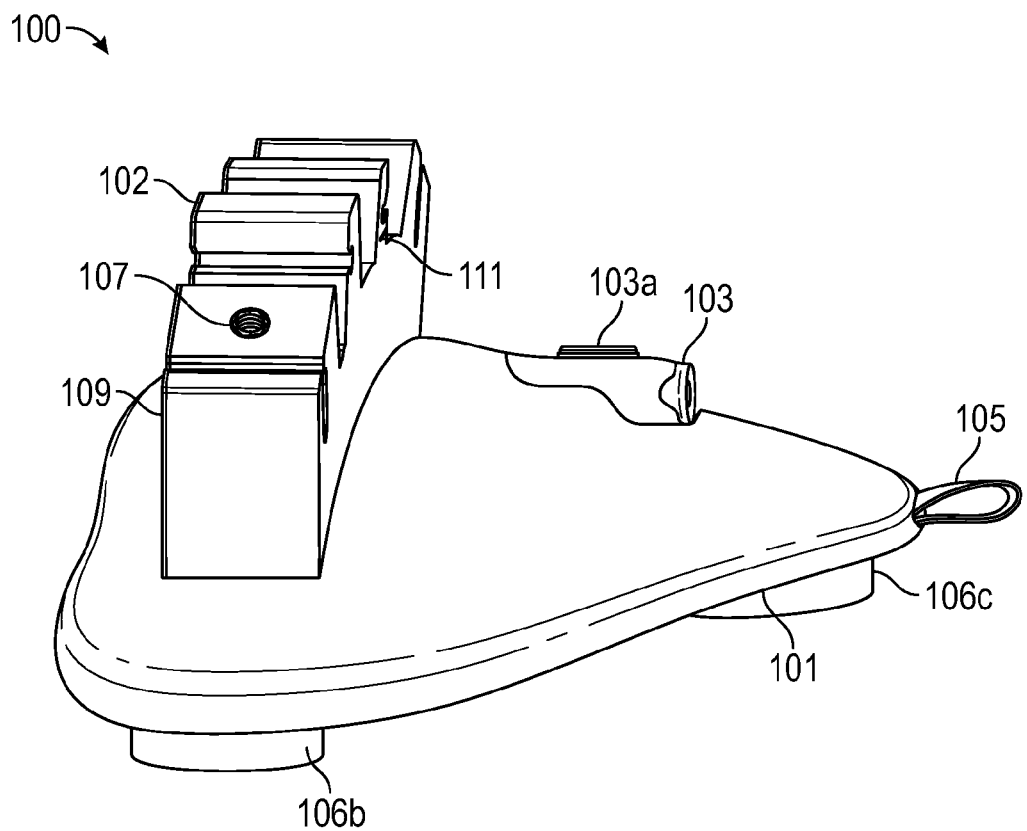
FIG. 4 illustrates a left side view of the magnetic supporting device of FIG. 1.

A bottom surface of body 101 can be substantially flat. As best shown in FIG. 3, a magnet or set of magnets 106a-106c can be positioned in each of the three corners of the triangular shaped bottom surface. In some instances, magnets 106a-106c are rigidly fixed to the bottom surface. In other instances, magnets 106a-106c are pivotally coupled to the bottom surface, wherein each magnet may pivot about a central axis or connection point to achieve an optimal interface with a compatible surface, such as the side of a vehicle. In some embodiments, such as is shown in FIG. 4, magnets 106a-106c can protrude from the bottom surface so that when supporting device 100 is placed on a surface, the bottom surface of the device will be spaced from the surface. Because of this spacing and the triangular arrangement of the magnets, when supporting device 100 is placed on an uneven surface, each magnet 106a-106c can still make contact with the surface. In other words, magnets 106a-106c provide a three point tiltable interface for coupling supporting device 100 to a surface. In some embodiments, more precise contact between the magnets and the surface may be achieved by providing a pivoting connection between magnets 106a-106c and the bottom surface of supporting device 100. In this way, supporting device 100 can still be coupled to an uneven surface with its full magnetic force.

Magnets 106a-106c can comprise any suitable magnetic material. However, to provide the greatest magnetic coupling force, magnets 106a-106c can comprise rare earth magnets such as neodymium or samarium-cobalt magnets. In some embodiments, magnets 106a-106c can be coated in a non-abrasive material such as rubber to prevent scratching of a surface to which supporting device 100 is coupled as well as to inhibit sliding of supporting device 100 while secured to the surface. To facilitate removing supporting device 100 from a surface, a loop 105 may extend from a front edge of body 101. Because loop 105 is positioned at the front edge of body 101, an upward force applied to loop 105 will cause magnet 106c to decouple prior to magnets 106a, 106b thereby reducing the force required to fully remove supporting body 100 from the surface.

Figure 2:
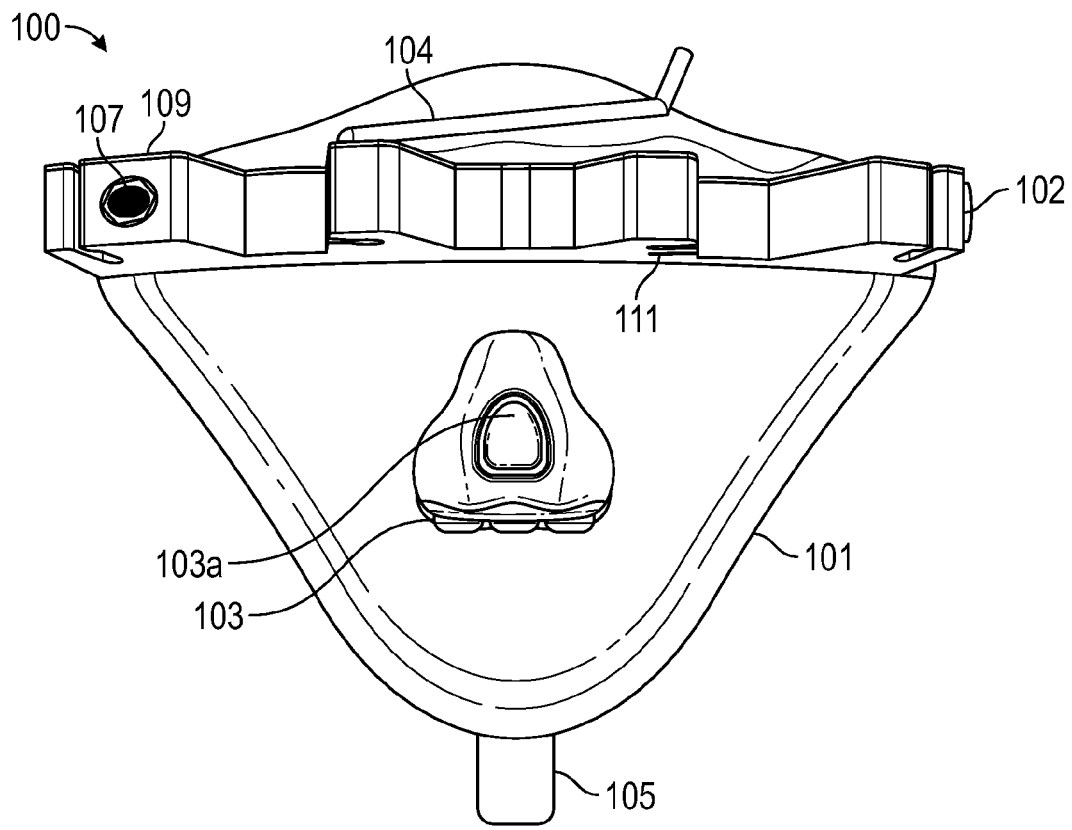
FIG. 2 illustrates a top view of the magnetic supporting device of FIG. 1.

Supporting device 100 also comprises a support structure 102 that extends outwardly from the top surface of body 101. Support structure 102 can be formed of a flexible, resilient material such as foam or rubber and can include a number of channels and slots within which items such as guns and fishing rods can be placed. By using a resilient material, items such as fishing hooks can be partially inserted into support structure 102 for temporary storage. In some embodiments, support structure 102 comprises a semi-rigid rubber material and further comprises a thin layer of resilient material 109, such as neoprene or sportsman foam that is added to one or more surfaces of support structure 102, as shown in FIG. 2. Thus, resilient material 109 provides a surface that may be used to temporarily store a fishing hook, such as during the process of attaching fishing line to the hook.

Figure 1:
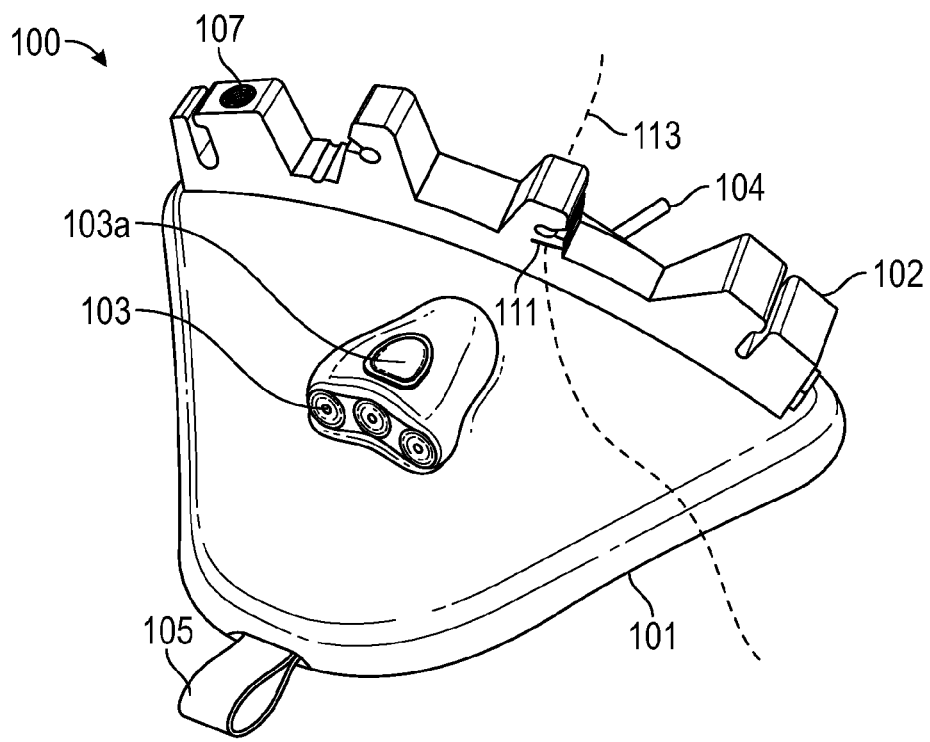
FIG. 1 illustrates a front perspective view of a magnetic supporting device that includes a supporting structure in accordance with one or more embodiments of the present invention.

Support structure 102 may further include one or more fishing line clamps 111, as shown in FIGS. 1, 2, 5A, 5B and 7. In some instances, clamp 111 comprises a slit that is located through or in one or more surfaces of support structure 102. Clamp 111 may be temporarily opened by bending or otherwise manipulating the portion of support structure 102 on which clamp 111 is located. The resilient nature of the material of support structure 102 causes clamp 111 to close once support structure 102 is released. In some embodiments, fishing line 113 is positioned and maintained within clamp 111, as shown in FIG. 1. In some instances, fishing line 113 is inserted into clamp 111 by simply aligning fishing line 113 with the opening of clamp 111 and forcing fishing line 113 into clamp 111. The opening and width of clamp 111 is less than the diameter of fishing line 113, and as such fishing line 113 is maintained within clamp 111 when clamp 111 is in a closed or released position. Once within clamp 111, the free end of fishing line 113 may be accessed by a user without fear of dropping or otherwise losing control of the free end.

Figure 5A:
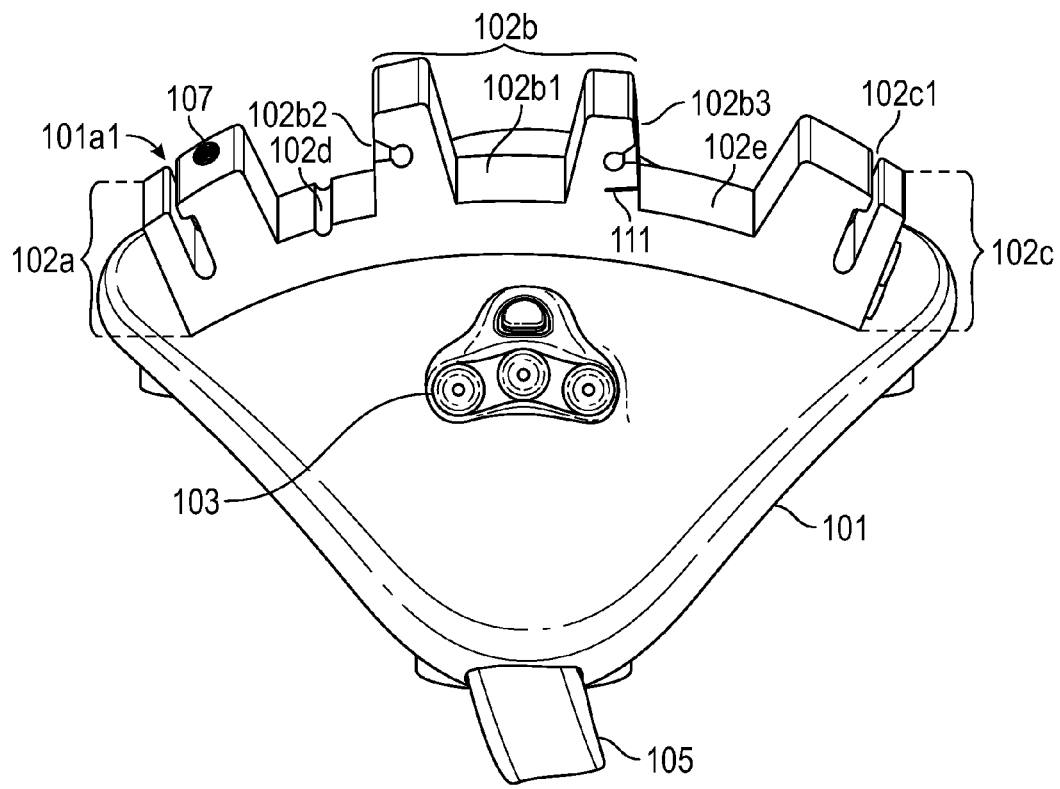
FIG. 5A illustrates a front view of the magnetic supporting device of FIG. 1.

Referring now to FIG. 5A, support structure 102 can comprise three protruding structures: protruding structure 102a positioned on a left side of body 101, protruding structure 102b positioned in the center of body 101, and protruding structure 102c positioned on a right side of body 101. Due to the curved top surface of body 101, protruding structures 102a-102c can be positioned at different heights.

A channel 102d can be formed between protruding structures 102a, 102b. Likewise, a channel 102e can be formed between protruding structures 102b, 102c. A similar channel 102b1 may also be formed within protruding structure 102b. Channels 102b1, 102d, 102e can be used to support a gun, bow, or other relatively larger item while supporting device 100 is attached to a magnetic surface including the side or hood of a vehicle. The curved top surface of body 101 causes channels 102b1, 102d, 102e to be at different heights to allow different sized items to be supported properly.

Protruding structures 102a-102c may also include a number of slots within which fishing rods, arrows, or other relatively smaller items can be placed and/or secured while supporting device 100 is attached to a magnetic surface. For example, protruding structures 102a, 102c each include a central slot 102a1, 102c1 having a width that conforms to the width of a standard fishing rod. Because support structure 102 can be formed of a resilient, flexible material, a fishing rod or similar item can be compressed within slots 102a1, 102c1 to substantially secure the fishing rod or other item to supporting device 100. In some instances, this can allow a fishing rod to be hung from supporting device 100.

In other instances, a middle portion of the fishing rod is supported by device 100 while a terminal end of the fishing rod is supported on the ground. Similarly, slots 102b2, 102b3 can be formed on opposite sides of protruding structure 102b. Slots 102b2, 102b3 can have an initially decreasing width that transitions into a circular end portion having a diameter that conforms to the diameter of an standard arrow. Because of the flexibility of protruding structure 102b, a fishing rod or other similarly sized item can be snapped into slots 102b2, 102b3 and secured within the circular end portion. In some instances, at least one of slots 102a1, 102b2, 102b3 and 102c1 are sized to receive and retain the leg of a harvested game bird, thereby suspending the bird from the device.

As discussed above, in some instances protruding structures 102a-102c may further include a fishing line clamp 111. Clamp 111 can be used to securely hold a fishing leader line while attaching a hook. Thus, the fishing rod may be secured in one of slots 102a1, 102b2, 102b3, 102c1 while the fishing line is secured in clamp 111.

In some embodiments, slots 102d, 102b1 and 102e comprise varying depths, as shown. The varying depths permit slots 102d, 102b1 and 102e to support objects of various lengths without requiring the vertical position of supporting device 100 to be adjusted. For example, an object having a shorter length may be supported in slot 102e while an object having a longer length is simultaneously supported in slot 102b1. An object having a middle length may also simultaneously be supported in slot 102d.

In some instances, slots 102d, 102b1 and 102e comprise a wedged or tapered shape, wherein the sidewalls of slots 102c, 102b1 and 102e taper outwardly from top surface of body 101. The wedge shape of slots 102d, 102b1 and 102e are provided to support objects of various shapes and sizes. For example, in some instances the wedge shape is provided to support a gun barrel or the fore end of a gun stock.

Figure 5B:
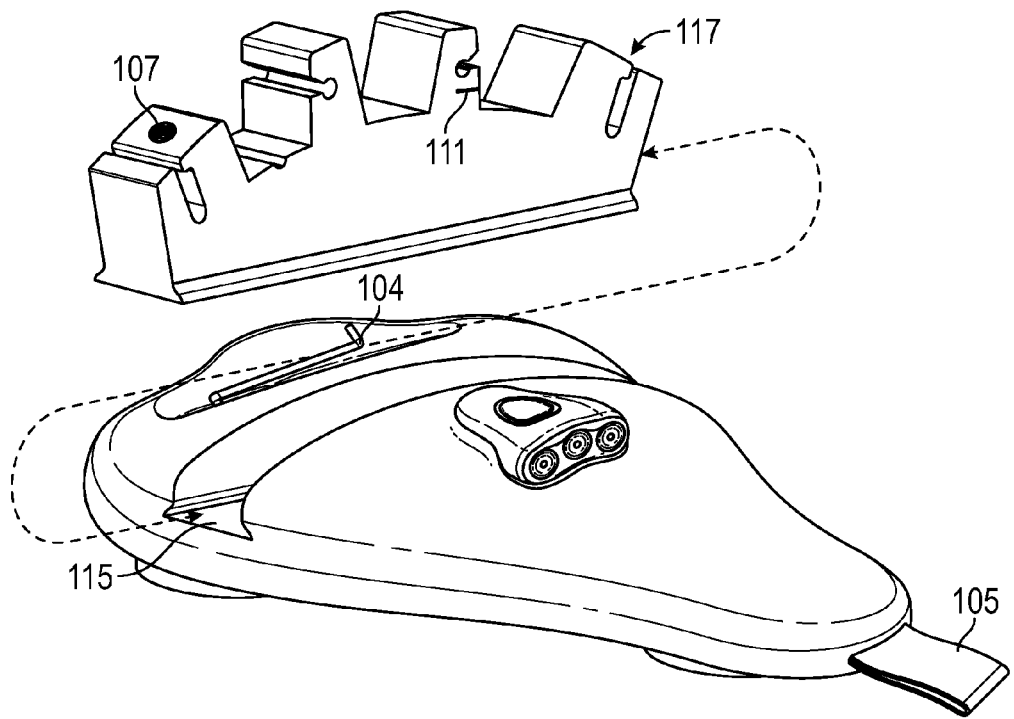
FIG. 5B illustrates side top view of a magnetic supporting device having an interchangeable supporting structure.

Referring now to FIG. 5B, in some embodiments body 101 further comprises a channel 115 configured to receive a removable support structure 117. In some instances, channel 115 is configured to interchangeably receive a plurality of removable support structures 117. In some embodiments, removable support structure 117 is slidably inserted and retained within channel 115. Some embodiments further comprise a keyed interface between channel 115 and removable support structure 117, as shown. In some instances, a removable support structure is provided having various surfaces and structures that are optimized for a particular sport, such as fishing. In other instances, a removable support device is provided having a variety of pieces that may be selectively removed or altered by a user to customize the surfaces and structure of the support device to one or more particular sports. Removable support surface 117 may further comprise a secondary support surface (not shown) that may be exposed for use by inserting removable support surface 117 into channel 115 in an inverted orientation, whereby the presently exposed support surface 117 is positioned within channel 115 and a secondary support surface (not shown) extends outwardly from the top surface of body 101.

Referring now to FIGS. 5A and 5B, in some embodiments, supporting device 100 can include a light 103 that is embedded within the top surface of body 101. A switch 103a can also be positioned on the top surface of body 101 for controlling the functionality of light 103. In some embodiments, light 103 may be removably attached to body 101 so that light 103 can be used separately from supporting device 100. Light 103 can have different modes of operation such as different levels of brightness, different colors of light, etc. Such modes could be controlled via switch 103a or another input device. In some embodiments, light 103 can be configured to pivot within body 101 to provide light at different angles without moving supporting device 100. In some instances, light 103 provides supplemental light for loading gun ammunition, connecting fishing hooks and rods, and/or field dressing game animals in low light conditions. These types of activities are often performed in low light conditions due to the requirements of various outdoor activities, and as such light 103 may assist the user while these types of activities or tasks are carried out.

In some embodiments, supporting device 100 can also include a hook 104 which can be used to hang items from supporting device 100 while the supporting device is coupled to a surface. Hook 104 can be configured to pivot between a closed position and an open position. For example, as best shown in FIG. 2, hook 104 can be positioned against the top surface of body 101 when the hook is not in use. When in the open position, hook 104 provides a hanging surface which may be used to support a variety of items, including but not limited to a bow, a jacket, a camera strap, car keys, and the like. In some embodiments, the top surface of body 101 can include a groove within which hook 104 sits when in the closed position. In some embodiments, hook 104 can be coated with a rubber material to better secure items hung therefrom and/or to prevent damage to such items. In some embodiments, loop 105 can also be used to hang an item from supporting device 100.

Figure 6:
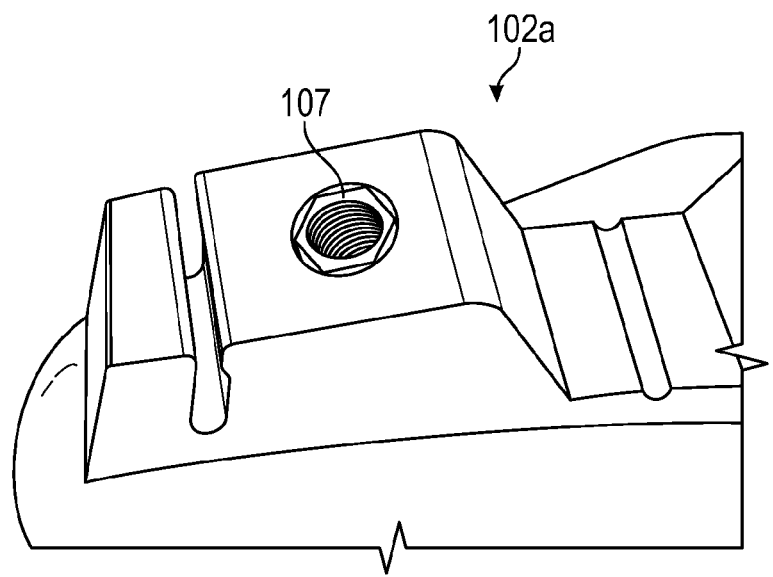
FIG. 6 illustrates a threaded mount that can be included within a protrusion of the supporting structure.
Figure 7:
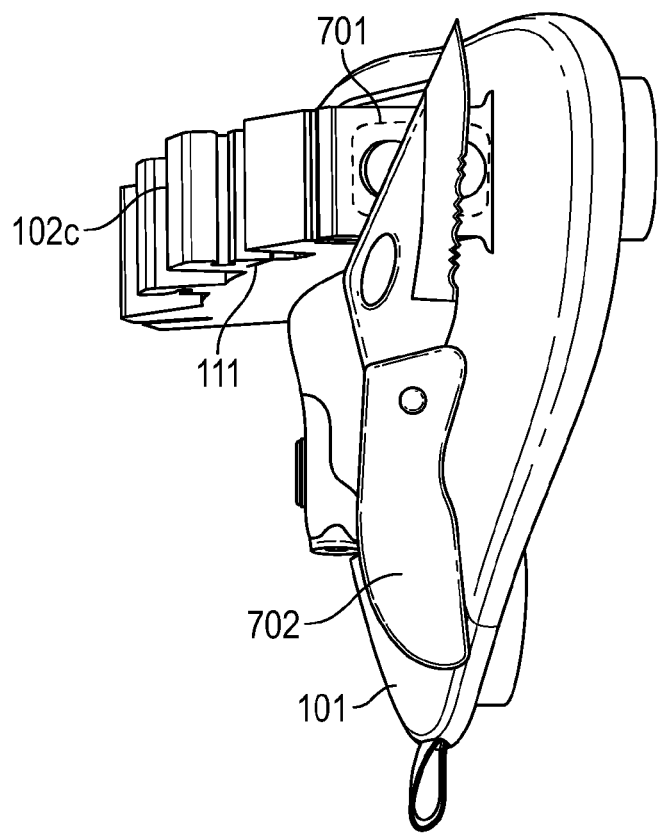
FIG. 7 illustrates that the supporting structure can include a magnet for securing a knife or other magnetic item to the supporting structure.

In some embodiments, support structure 102 can incorporate a threaded mount to allow an item such as a camera, camcorder, scope, or fly tying vice to be mounted to supporting device 100. For example, FIG. 6 illustrates a threaded mount 107 that is incorporated into protruding structure 102a adjacent slot 102a1. Threaded mount 107 can be configured to accept a threaded adapter (e.g., a tripod screw) to allow supporting device 100 to function similar to a tripod. In some embodiments, an adapter for mounting a fly tying vice to threaded mount 107 can also be provided. Such an adapter can include a screw on one end for inserting into threaded mount 107 and an adapter on the other end that is configured to attach to a fly tying vice.

In some embodiments, support structure 102 can include one or more magnets to allow a magnetic item to be secured directly to the support structure. For example, in FIG. 7, a knife is shown secured to a magnet 701 that is positioned along the side of protruding structure 102c. Other items such as forceps, pliers, or line cutters could also be secured to support structure 102 via magnet 701. Magnet 701 could be embedded within protruding structure 102c or could be attached to an exterior surface of protruding structure 102c. In embodiments where magnet 701 is attached to the surface of support structure 102, magnet 701 can be coated with a rubber or other material to protect items that may be secured thereto. In some embodiments, a magnet may additionally or alternatively be positioned on the top surface of body 101.

Figure 9:
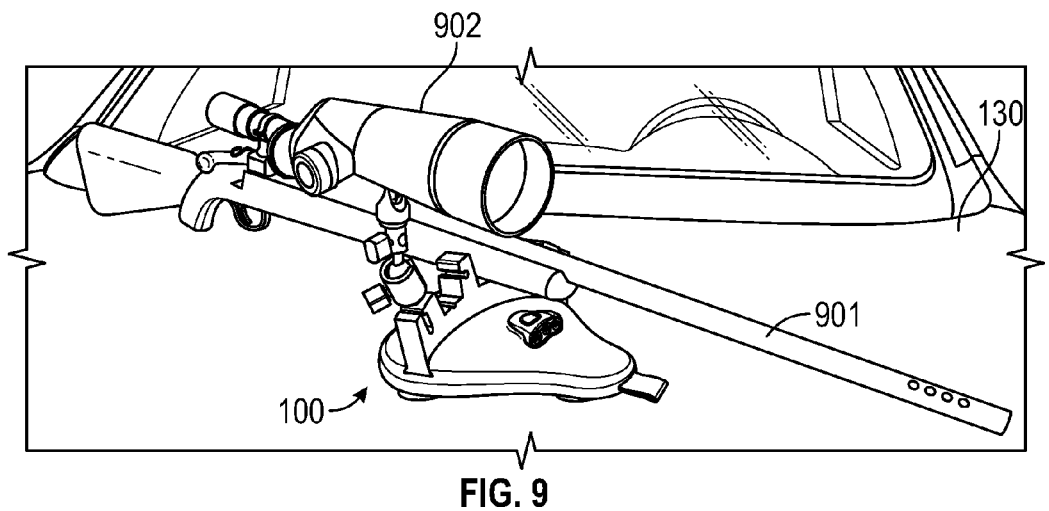
FIG. 9 illustrates the magnetic supporting device when used to support a gun and a scope while the device is placed on the hood of a vehicle.
Figure 10:
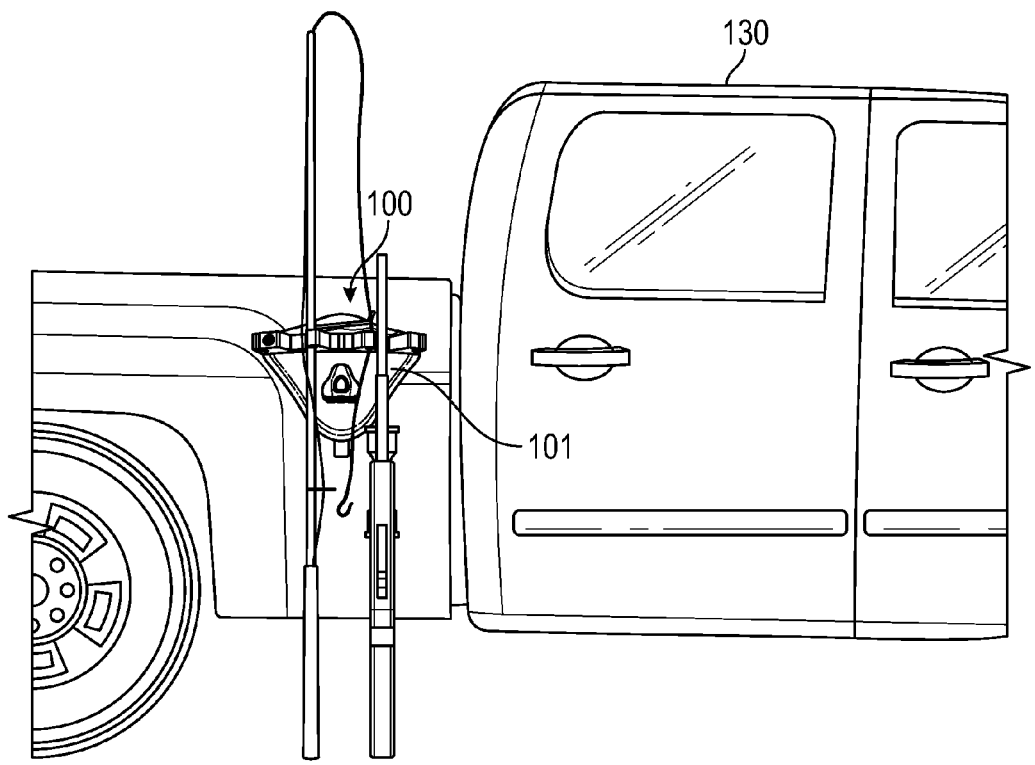
FIG. 10 illustrates the magnetic supporting device when used to support a gun and fishing rod while the device is attached to the side of a vehicle.

As stated above, supporting device 100 can be coupled to any magnetic surface whether horizontal or vertical and used to support a number of items. FIGS. 8-10 illustrate various examples of how supporting device 100 can be used.

Figure 8A:
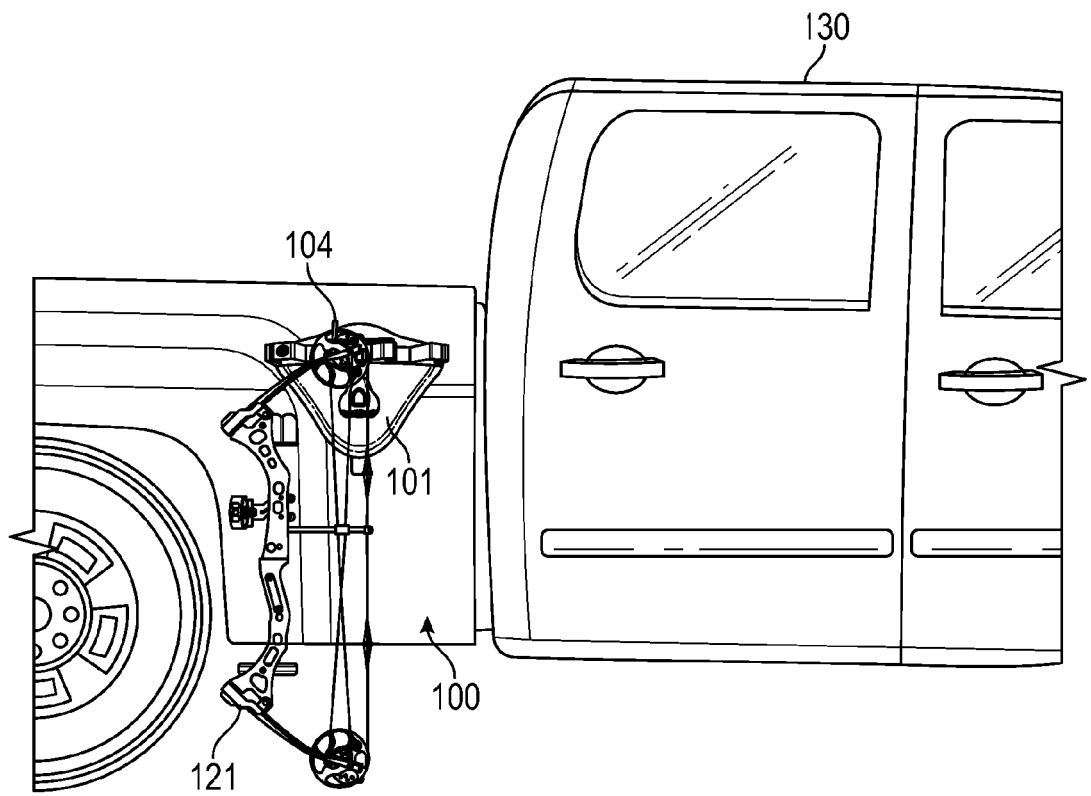
FIG. 8A illustrates the magnetic supporting device when used to hang an item while the device is attached to the side of a vehicle.
Figure 8B:
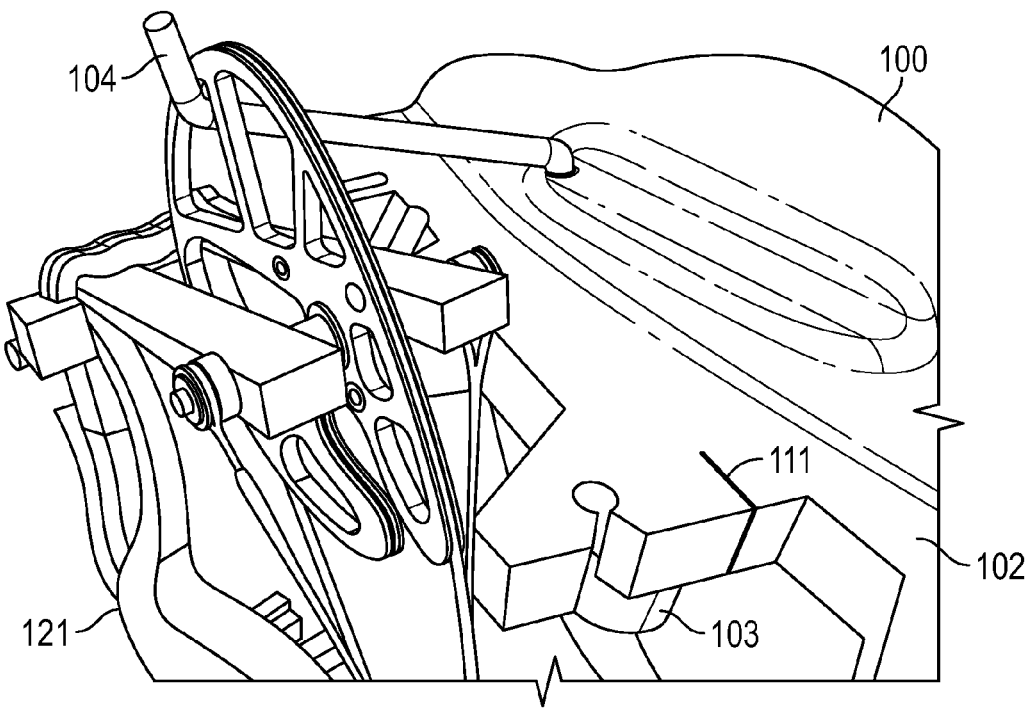
FIG. 8B illustrates a detailed view of the hook in an extended position.

FIG. 8A illustrates supporting device 100 when attached to the side of a vehicle 130 via magnets 106a-106c. Supporting device 100 is oriented with its back end facing up so that when hook 104 is pivoted into the open position, it can be used to hang an item, as discussed above. A detailed view of the extended position of hook 104 is shown in FIG. 8.

For example, if a sportsman were hunting or fishing, hook 104 could be used to hang a bird or fish. If a sportsman were bow hunting, hook 104 may be used to support the sportsman's bow 121. At the same time, a gun may be supported within one of channels 102b1, 102d, 102e while a fishing rod may be supported in slots 102a1, 102b2, 102b3, 102c1. Similarly, hook 104 could be used to hang keys, binoculars, a jacket, a fishing or shooting vest, a gear box, sunglasses, or any other item.

In one embodiment, device 100 is positioned on vehicle 130 at a height sufficient to support an item (such as bow 121) at a position that is suspended above the ground surface. As such, the item is prevented from touching the ground. In one embodiment, magnets 106a-106c are sufficiently strong, and provide a sufficient magnetic interface with vehicle 130 to support the weight of the item or items coupled to hook 104, as well as other items that may be coupled to or supported by support surface 102.

FIG. 9 illustrates supporting device 100 when placed on the hood of a vehicle. In this position, one of channels 102b1, 102d, 102e could be used to support the barrel of a gun during a shot. The differing heights of channels 102b1, 102d, 102e can facilitate use of supporting device 100 to support guns of different sizes and lengths. A telescopic or spotting scope 902 is also mounted to protruding structure 102a via threaded mount 107. Similarly, a camera or camcorder could be mounted to protruding structure 102a to capture the shot. Magnets 106a-106c secure supporting device 100 to the hood to prevent it from sliding. Light 103 could also be turned on to illuminate and facilitate a shot at in dark or low light conditions.

FIG. 10 illustrates supporting device 100 when attached to the side of a vehicle via magnets 106a-106c in a similar orientation as shown in FIG. 8. However, in FIG. 10, hook 104 is in a closed position. A gun 1001 is supported within channel 102e while a fishing rod is snapped into slot 102b2. In this orientation, support structure 102 could also be used to support a phone by placing the phone on top of support structure 102 and leaning it against the top surface of body 101. The phone could then be used to take a timed picture of sportsmen or game.

In some embodiments, it may be desirable to use supporting device 100 on a non-magnetic surface. Accordingly, various attachments can be provided to configure supporting device 100 for coupling to such surfaces. For example, for coupling supporting device 100 to a non-magnetic smooth surface such as when a vehicle includes a plastic or aluminum surface, suction cup adapters can be provided. Each suction cup adapter can include a magnetic side for coupling the adapter to one of magnets 106a-106c and a suction cup side for securing the adapter to the surface. In some embodiments, one or more of the suction cup adapters may be interconnected.

A strap adapter may be provided to allow supporting device 100 to be coupled to a tree or other large structure. The strap adapter may comprise a magnetic frame that secures to magnets 106a-106c and to which an adjustable strap is coupled. The adjustable strap can be wrapped around a tree or similar structure and tightened until supporting device 100 is held firmly against the structure. Supporting device 100 can then be used as described above such as is shown in FIGS. 8-10.

A mounting adapter may be provided to allow supporting device 100 to be mounted to a bumper or roll bar of a utility vehicle, including an all tertian or side-by-side vehicle. Similar to the strap adapter, the mounting adapter can include a magnetic frame that secures to magnets 106a-106c. The mounting adapter can also include a mounting bracket that can be tightened around a rod-shaped object such as a bumper or roll bar to secure supporting device 100 to the object. Once secured, supporting device 100 can be used in any of the ways described above.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed is:

1. A magnetic supporting device comprising:
    a body having a triangular shape, the body having a substantially flat bottom surface and a top surface having a recessed channel;
    one or more magnets positioned in each corner of the triangular shape on the bottom surface of the body, a bottom surface of each magnet being spaced from the bottom surface of the body; and
    a support structure selectively coupled to the recessed channel and extending upwardly from the top surface of the body, the support structure including one or more protruding structures for supporting an item when the item is placed in contact with the support structure.

2. The magnetic supporting device of claim 1, wherein the body is rigid.

3. The magnetic supporting device of claim 1, wherein each of the magnets includes a rubber coating.

4. The magnetic supporting device of claim 1, wherein the one or more magnets comprise a plurality of magnets.

5. The magnetic supporting device of claim 1, wherein the support structure comprises a flexible, resilient material.

6. The magnetic supporting device of claim 5, wherein the flexible, resilient material is dense foam or rubber.

7. The magnetic supporting device of claim 1, wherein at least one of the protruding structures includes a channel sized to receive a barrel of a gun.

8. The magnetic supporting device of claim 1, wherein at least one of the protruding structures includes a slot sized to receive a fishing rod.

9. The magnetic supporting device of claim 1, wherein the support structure forms a channel between one or more sets of protruding structures.

10. The magnetic supporting device of claim 1, wherein the support structure comprises three protruding structures.

11. The magnetic supporting device of claim 1, wherein the support structure comprises one or more slits for securing fishing line.

12. The magnetic supporting device of claim 1, wherein the support structure includes a threaded mount.

13. The magnetic supporting device of claim 1, wherein the support structure includes a magnet for securing a magnetic object to the support structure.

14. The magnetic supporting device of claim 1, further comprising:
    a hook that extends from the body, the hook configured to pivot between a closed position in which the hook extends along the body and an open position in which the hook extends outwardly from the body to enable an object to be hung from the magnetic supporting device.

15. The magnetic supporting device of claim 1, further comprising a light that is incorporated into the body.

16. The magnetic supporting device of claim 15, wherein the light is removably attached to the body.

17. The magnetic supporting device of claim 15, wherein the light pivots within the body.

18. The magnetic supporting device of claim 1, further comprising:
a magnetic adapter configured to attach to one or more of the magnets to allow the magnetic supporting device to be coupled to a non-magnetic surface, the magnetic adapter comprising a suction cup adapter, a strap adapter, or a mount adapter.

19. A magnetic supporting device comprising:
a body having a triangular shape, the body having a substantially flat bottom surface and a top surface having a recessed channel;
one or more magnets positioned in each corner of the triangular shape on the bottom surface of the body, each magnet extending outwardly from the bottom surface to form a three point tiltable interface for coupling the magnetic supporting device to a surface; and
a support structure selectively coupled to the recessed channel and extending upwardly from the top surface of the body, the support structure including one or more protruding structures for supporting an item when the item is placed in contact with the support structure.

20. A magnetic supporting device comprising:
a body having a triangular shape, the body having a substantially flat bottom surface and a curved top surface having a coupling feature;
one or more magnets positioned in each corner of the triangular shape on the bottom surface of the body, a bottom surface of each magnet being spaced from the bottom surface of the body; and
a support structure selectively coupled to the coupling feature and extending upwardly from the top surface of the body, the support structure including a first protruding structure positioned on one side of the top surface, a second protruding structure positioned on an opposite side of the top surface, and a third protruding structure positioned between the first and second protruding structures.

* * * * *